Patented Dec. 23, 1930

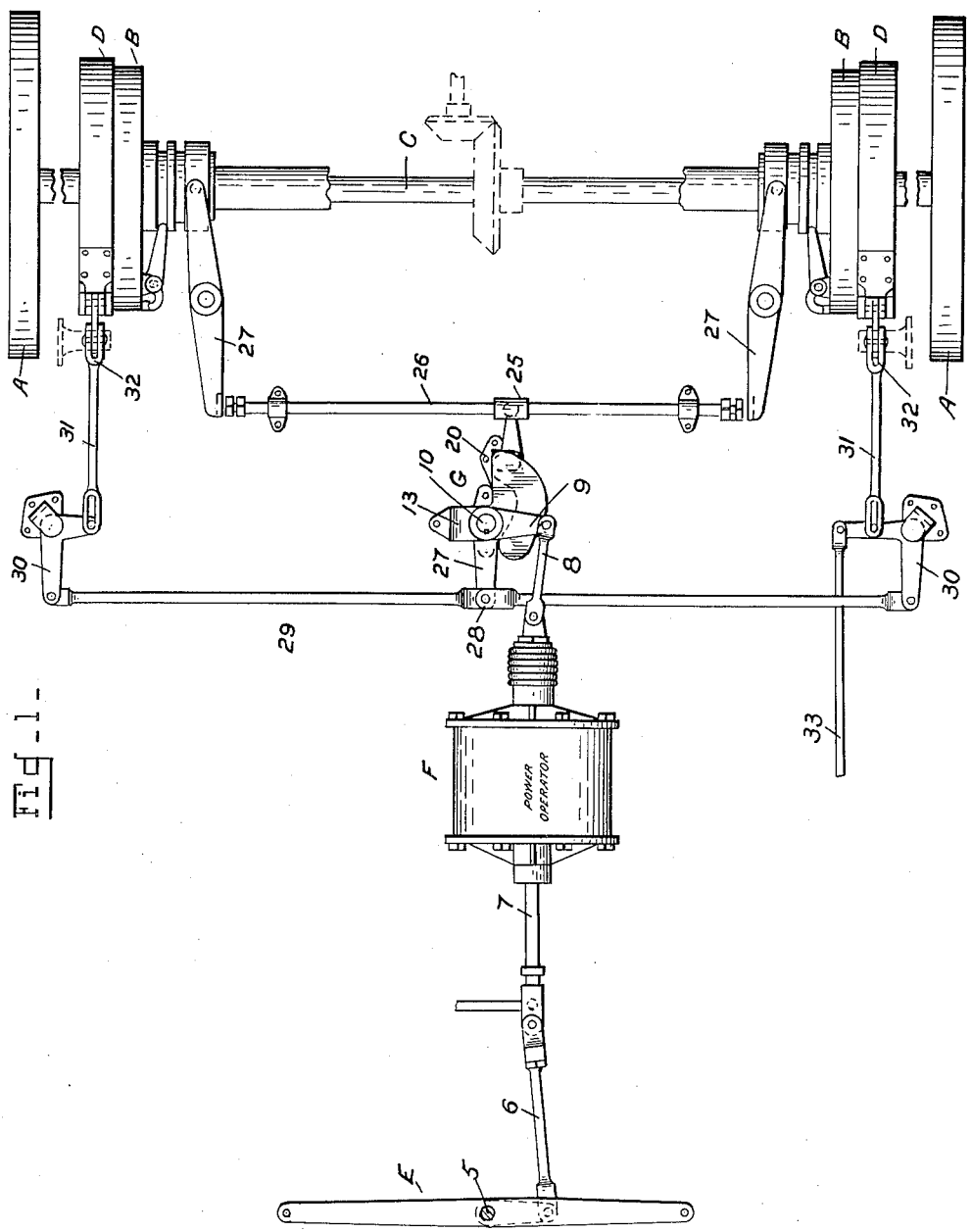

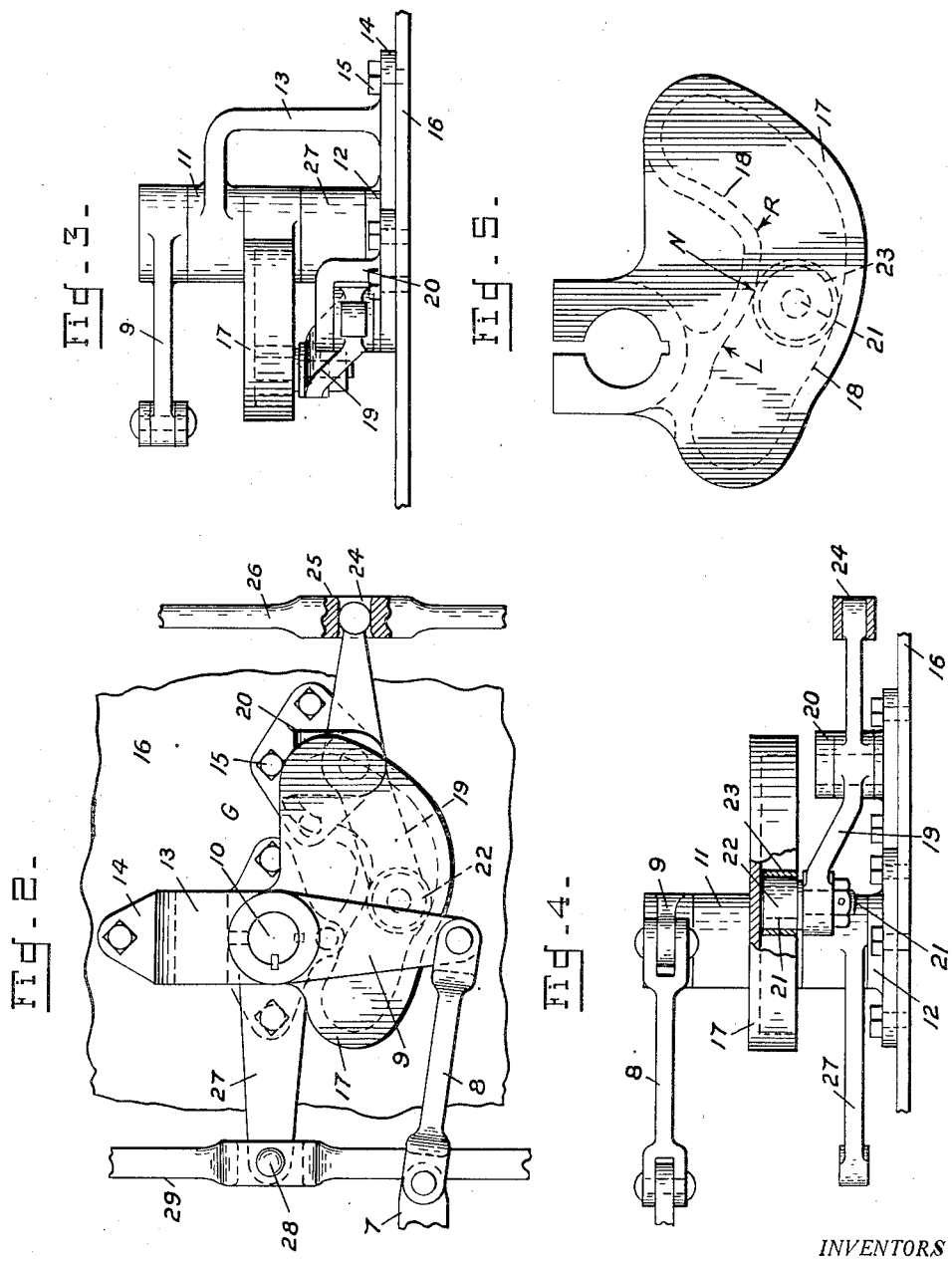

1,785,738

UNITED STATES PATENT OFFICE

HARRY A. KNOX AND BERT F. BAKER, OF DAVENPORT, IOWA

STEERING-CONTROL SYSTEM FOR VEHICLES

Application filed March 17, 1930. Serial No. 436,613.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to us of any royalty thereon.

This invention relates to a steering control system for vehicles.

In steering a vehicle by driving one side of the traction elements while the other side is operated at reduced speed or completely disengaged the effort required to manipulate the control is considerable and the operator soon becomes fatigued.

The purpose of the present invention is to so organize a manual steering control that an automatic system normally adapted for the application of power to simultaneously apply or to release a number of brakes may be made, without modification to the automatic system, to selectively apply or release brakes, clutches and like units.

The provision whereby this separation and diversion of the actuating force is accomplished includes a cam affording a dual control of the traction elements on either side of the vehicle. The initial movement of the cam operates to disengage a steering clutch and the continued movement of the cam, while holding the steering clutch disengaged without reaction on the system, operates a brake on the corresponding side of the vehicle.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a plan view of a steering control arranged in accordance with the invention;

Fig. 2 is a plan view of the cam group;

Fig. 3 is a view in rear elevation of the cam group;

Fig. 4 is a view in side elevation of the cam group;

Fig. 5 is a detail face view of the cam plate.

Referring to the drawings by characters of reference:

In Fig. 1 the wheels A—A represent the drive members on each side of the vehicle and may be either in the form of a traction wheel or the driving wheel of an endless belt of the self-laying track type. Associated with each of the wheels A is a steering clutch B whereby the power shaft C may be engaged or disengaged from the wheels A. Also associated with each of the wheels or the steering clutches is a brake mechanism D.

The operation of the steering clutches and the brake mechanisms is under the control of a remotely situated bar E centrally fast on the upper end of a steering post 5 and swinging in a horizontal plane. Attached to the lower end of the steering post 5 is a rod 6 connected to the valve rod 7 of a power operating system F which, for example, may be of a well-known vacuum type employed to simultaneously apply and to simultaneously release the brake mechanisms of motor vehicles.

The other end of the valve rod 7 is connected through a link 8 to the actuating arm 9 of a cam unit G. Specifically, the arm 9 is fast on a vertical shaft 10 (Figs. 2 and 3) supported in spaced bearings 11 and 12 which are interconnected by a yoke 13 having apertured ears 14 whereby the yoke is secured through bolts 15 to a supporting plate 16.

Mounted on the shaft between the bearings and fast thereon is a plate 17 having in its under face a cam groove 18. A lever 19 fulcrumed in a bracket 20 has a lateral stud 21 on the end of one of its arms for carrying an anti-friction bearing 22 and a roller 23, the latter running in the cam groove 18. The other arm of the lever 19 terminates in an aperture 24 provided in a collar 25 on a transversely disposed rod 26. This rod extends to the free ends of the throw-out levers 27 of the opposite clutches B—B.

Fast on the shaft 10 between the cam plate 17 and the bearing 12 is a lever 27a having the same angular displacement as the cam and whose outer end is connected through the pin 28 to a transversely disposed rod 29.

The extremities of the rod 29 are each connected to a bell crank 30 which, in turn, is connected through a slotted link 31 to the actuating lever 32 of the brake D.

Referring now to Fig. 5, the neutral position of the cam groove is indicated at N. From this point to a point L the radius from the pivot O is decreasing and to a point R the radius is increasing. From the points L and R to the respective ends of the cam groove the radius is uniform so that the terminal portions of the cam groove form regular arcs about the axis of rotation of the cam plate.

In Fig. 1 the parts are all shown in the normal position, the clutches B—B being engaged, the brakes D—D being disengaged and the roller 23 of the lever 19 being at the neutral point N of the cam groove. In order to actuate the right hand units of the vehicle to disconnect the drive to the corresponding wheel A, the bar is moved clockwise. This acts through the power operating system F to move the arm 9 forwardly and to similarly displace the cam plate 17. During the initial displacement of the cam plate, while the roller 23 moves between the points N and R, the lever 19 is oscillated to move the rod 26 to the right and actuate the throw-out lever 27 of the right hand clutch B and thereby interrupt the transmission of power to the corresponding wheel A.

During the continued movement of the cam plate the roller moves in the arc beyond the point R and, consequently, the clutch will be held disengaged against the action of the clutch spring (not shown). While the roller is in the arc, the reaction of the clutch spring is ineffective to counterrotate the lever 19 since the force applied to the cam plate is directed to the rigidly supported axis of rotation thereof.

Initial movement of the arm 9 actuates the rod 29 and takes up the slack in the brake linkage and final movement results in the application of the brakes. This final movement is preferably arranged to correspond with the period during which the roller is in the arc of the cam groove.

The operation of the clutch and brake on the left hand side of the vehicle is similar and opposite to that just described for the right hand units.

One of the brakes, in the present instance the left hand brake, is to be used as a parking brake and may be independently actuated through a manually controlled rod 33 connected to the bell crank 30.

If the power operator should fail to function the manual control remains effective to actuate the arm 9.

We claim:

1. In a control system for power vehicles, a pair of steering clutches and brake mechanisms, a control member and operative connections between the control member and the steering clutches and brake mechanisms including a power operator under control of the control member, a cam member movable by the power operator, a lever having one end under control of the cam member, a rod reciprocable by said lever to selectively disengage the clutches, a lever having the same angular movement as the cam member, and a rod reciprocable by said lever to selectively apply the brake mechanisms.

2. In a control system, a pivoted plate formed with a cam groove whose terminal portions are arcs on different radii, means for oscillating the plate, a lever engageable in the cam groove of the plate and being in neutral position at a point intermediate the arcs of the cam groove, a clutch operating member under control of the lever, and a brake operating member movable with the cam plate having the same angular movement as the cam plate.

3. In a control system for power vehicles, a pair of steering clutches and brake mechanisms, a control member, a pivoted cam member movable by the control member, a lever parallel to the cam member and having one end under control of the cam member, means reciprocable by said lever to selectively disengage the clutches, a lever fast on the pivot of the cam member, and means reciprocable by said lever to selectively apply the brake mechanisms.

HARRY A. KNOX.
BERT F. BAKER.